July 16, 1968    S. FEHRENBACH    3,393,387
HOLDING ARRANGEMENT FOR MEASURING INSTRUMENT
Filed March 14, 1966    2 Sheets-Sheet 1

INVENTOR:
SIEGFRIED FEHRENBACH
by:
Stephen H. Frishauf
Att'y

INVENTOR:
SIEGFRIED FEHRENBACH
by
Stephen H. Frishauf
Atty

United States Patent Office 3,393,387
Patented July 16, 1968

3,393,387
HOLDING ARRANGEMENT FOR MEASURING INSTRUMENT
Siegfried Fehrenbach, Stuttgart-Botnang, Germany, assignor to Robert Bosch G.m.b.H., Stuttgart, Germany, a limited-liability company of Germany
Filed Mar. 14, 1966, Ser. No. 534,108
Claims priority, application Germany, Mar. 23, 1965, B 81,115
9 Claims. (Cl. 335—285)

ABSTRACT OF THE DISCLOSURE

To secure a measuring instrument against inadvertent dislocation, a magnet is located below the base of the measuring instrument, and arranged to become effective to attract against a ferromagnetic plate in the support for the instrument; it may be an electromagnet, which is energized to become effective, or a permanent magnet, with pole pieces to shortcircuit magnetic force, and further located so that the magnet can be manually pressed downwardly against the support surface for the instrument.

---

The present invention relates to a holding arrangement for measuring instruments to secure or hold the instrument to the surface or support on which it stands, and more particularly to a holding arrangement for measuring instruments which includes projection apparatus to measure angles of automotive vehicle axles and their alignment.

Axle measuring projectors may be used in pairs, one located opposite the other and aligned with respect to each other. Customarily they are merely placed on the floor on which the vehicle to be measured is located. It may thus occur that these instruments are moved, causing misalignment.

It is an object of the present invention to provide a holding arrangement for measuring instruments preventing inadvertent dislocation of an instrument from its predetermined position.

Briefly, in accordance with the present invention, a magnet is placed on the base of the measuring instrument, preferably on the bottom thereof, and arranged to be rendered active or inactive, so that, when in the active position, it will hold the apparatus immovably against a ferromagnetic plate on the support for the instrument, for example the floor.

In accordance with an embodiment of the invention, the magnet is located below a resilient membrane. The membrane is secured to adjusting screws which adjust the position of the measuring instrument, and is so arranged that regardless of the adjustment of the base by the adjusting screws, the magnet has always the same air gap with respect to the floor on which the vehicle, and the instrument stands.

The structure, organization and operation of the invention will now be described more specifically in the following detailed description with refernce to the accompanying drawings, in which.

Figure 1:
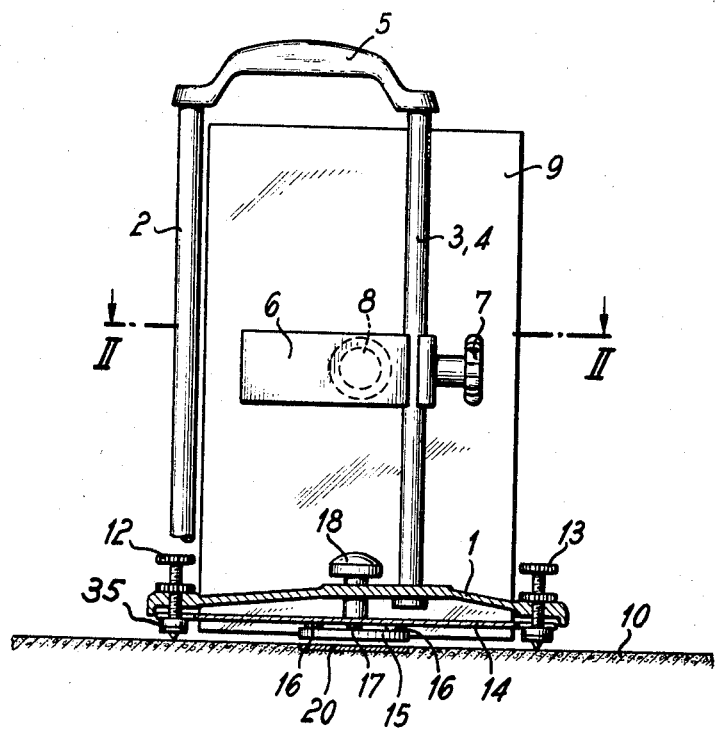
FIG. 1 is a front view of the measuring instrument having a magnetic holding arrangement.

Referring now to the drawings: the measuring apparatus of FIG. 1 has a base plate 1, on which three vertical columns, 2, 3, 4, are secured, joined on the top by means of a handle part 5. A housing 6 for a projector is clamped on columns 3 and 4, by means of a clamping screw 7. The projector, not further illustrated, has an objective lens 8 which extends beyond the housing 6. An indicator panel 9 cooperates with the projector and objective 8, to indicate light beams reflected from mirrors secured to the rim of the wheel of the vehicle to be tested, or for light projected by the second projector. Lens 8 extends through indicator panel 9.

Before taking a measurement, the apparatus must be adjusted. Adjustment about a vertical axis is by means of adjustment screw 11 (FIG. 2); further adjusting screws 12, 13 are provided to locate the base plate 1 parallel to the floor surface 10. As soon as the apparatus is adjusted, it can be secured against displacement, by bringing a magnet 15 in cooperation, that is in magnetic attraction, with a ferromagnetic plate 20 recessed into the surface 10. The magnet 15 is secured to a membrane 14, which is, in turn, resiliently held by collars 35 on adjustment screws 11, 12, 13.

The magnet, in accordance with the present invention, is resiliently held against the membrane 14 by means of three foam rubber discs 16. Magnet 15 is secured in a bore or opening within membrane 14 by means of a holding screw 17 and guided in the membrane by a hemispherical or conical guide so that it may swing in all directions to permit conformity to unevenness.

Figure 3:
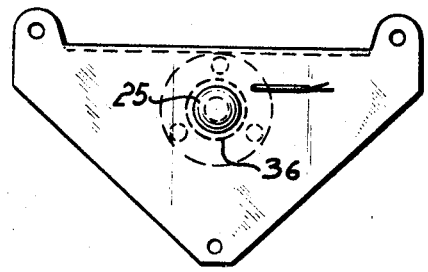
FIG. 3 is a top view of the base plate in an instrument furnished with an electro-magnet.

The magnet may be an electro-magnet for direct, or alternating current. If for alternating current, it is provided with a short circuited induction winding 36 (FIG. 3) which, by causing a phase shift, continues to provide magnetic effect when single phase alternating current passes through the null point. The magnet may also be a permanent magnet.

The magnet must be rendered ineffective when the apparatus is being adjusted. Thus, means are provided to avoid, or substantially decrease the magnetic effect of the magnet 15 in the plate 20, recessed in surface 10, during adjustment of the instrument. Referring to FIG. 1, a button or knob 18 is provided, arranged either as a rotatable knob, as a press-down button, or as a turn-switch, depending upon the type of magnet or the arrangement for rendering it effective.

Figure 2:
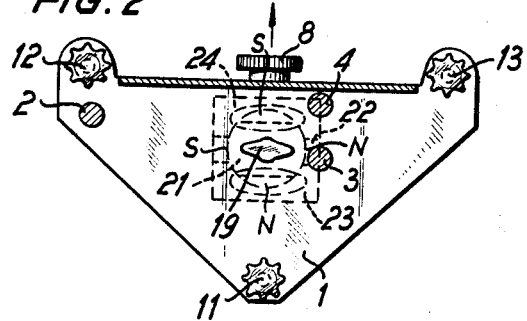
FIG. 2 is a cross sectional view on lines II—II of FIG. 1, omitting the projector housing, and illustrating a permanent magnet.

FIG. 2 shows a permanent magnet with a pole switch. The knob is formed as a rotating switch 19. The poles N and S of a round permanent magnet 15 are located to be in a gap 21 between a pair of iron cores 23, 24 located in the magnet housing. In the position shown in FIG. 2, the magnet is rendered ineffective. When the magnet is turned 90° by means of the handle 19, the magnetic action is increased by magnetic flux through the iron cores 23, 24. An air gap 22 may be provided between cores 23, 24. The membrane 14 will deflect resiliently downwardly and the magnet will adhere to iron plate 20 flush with surface 10.

The magnet holding arrangement, utilizing a permanent magnet, can also be arranged in such a manner that a magnet is used which is just sufficiently strong that it cannot deflect the membrane even when it is located above the iron plate. The button, which is then formed as a knob 25 (FIG. 3) can then be used to press the magnet downwardly against the resilience of the membrane, by hand, until the magnet comes in contact with and adheres to plate 20.

Figure 5:
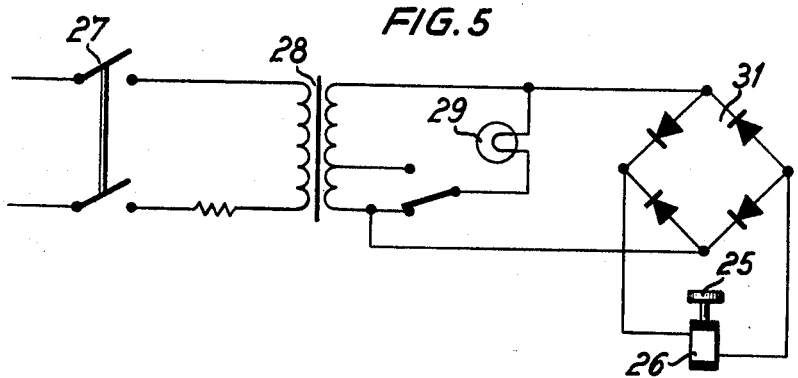
FIG. 5 is a schematic circuit diagram for a holding arrangement with a non self-adhering electro-magnet.

An electro-magnet, likewise, can be constructed in such a way that it will not, by itself, be attracted to the iron plate unless it is first mechanically pressed thereagainst, together with the membrane. In this case, the magnet is likewise formed with a button, or knob 25. For such an arrangement, an electrical circuit as shown in FIG. 5, in connection with a direct current magnet 26, may be used. According to the circuit of FIG. 5, a main switch 27 is connected to a transformer 28, for example over a fuse (not separately numbered). The secondary of the transformer is connected to a projection lamp 29, which can be switched over from a tap to the full winding of the transformer. A rectifier 31 is likewise connected to the secondary of transformer 28. Electro-magnet 26 is connected, in known manner, to the rectified direct current circuit of the rectifier 31. Magnet 26 must be pressed downwardly by knob or handle 25 until the magnet adheres to the iron plate 20 to immovably secure the instrument against the floor 10. The magnet may remain connected for the period that the projection lamp is connected. A further switch to disconnect the magnet alone is not necessary.

Figure 4:
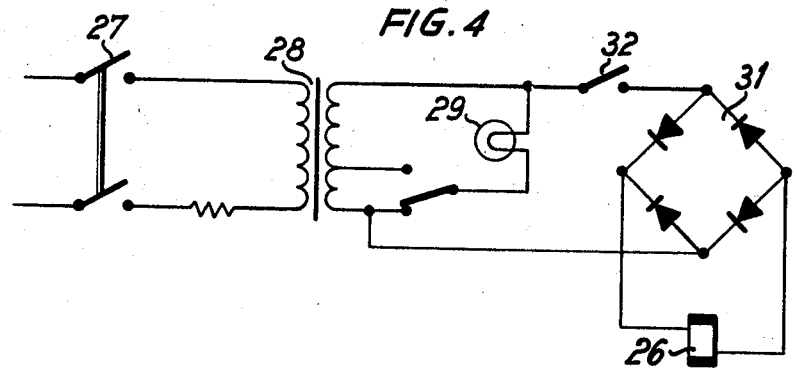
FIG. 4 is a schematic circuit diagram for a holding arrangement having a self-adhering electro-magnet.

When a self-adhering magnet is used, the knob is constructed as an electrical switch 32, as shown in FIG. 4, preferably connected into the A-C network of the rectifier. In all other respects, the circuit of FIG. 4 is identical to the circuit for the non self-adhering magnet of FIG. 5. All conditions being equal, a greater adhesive strength can be achieved with non self-adhering magnets than with self-adhering magnets.

I claim:
1. Holding arrangement for a measuring instrument adapted to be placed on a support defining a support surface and having a ferromagnetic plate (20) located on said support, said holding arrangement comprising
 a base (1);
 a magnet (15);
 means movably supporting said magnet on said instrument below said base; and means selectively rendering the magnetic force of said magnet effective at the surface of said support so that said magnet will be attracted against the ferromagnetic plate (20) to hold the instrument immovable against the support.
2. Arrangement as claimed in claim 1 wherein said movable support means comprises a resilient membrane (14) extending beneath said base and secured to said instrument, said magnet being secured to said membrane.
3. Arrangement as claimed in claim 1 wherein said magnet is an electromagnet.
4. Arrangement as claimed in claim 2 including height adjustment screws (11, 12, 13) screwed into said base (1) to adjust the height of the base with respect to the support; said membrane (14) being held by said adjustment screws and mounted independently of said base whereby the air gap of said magnet (15) with respect to said plate (20) will be independent of the location of the base with respect to said support.
5. Arrangement as claimed in claim 2 including resilient spacer means (16) interposed between said magnet (15) and said membrane (14).
6. Arrangement as claimed in claim 2 wherein said magnet (15) is round, and a single central holding means for said magnet passes through said membrane.
7. Arrangement as claimed in claim 1 wherein said magnet is a permanent magnet.
8. Arrangement as claimed in claim 7 including a pair of spaced iron cores located thereon; said magnet being mounted to be rotatable with respect to said iron cores.
9. Arrangement as claimed in claim 1 including means moving said magnet in the direction of said support to bring said magnet in the region of mutual magnetic attraction between said magnet and plate.

References Cited
UNITED STATES PATENTS

| | | |
|---|---|---|
| 2,280,437 | 4/1942 | Levesque. |
| 2,637,115 | 5/1953 | Watson. |
| 2,780,875 | 2/1957 | Carr _____ 33—203.18 |
| 3,307,263 | 3/1967 | Castiglia et al. _____ 33—203.18 |

BERNARD A. GILHEANY, *Primary Examiner.*

G. HARRIS, *Examiner.*